July 10, 1962 L. A. MOXON 3,043,598
SEALING DEVICE
Filed Oct. 29, 1958

Leslie Allan Moxon
By Beaman & Beaman

United States Patent Office 3,043,598
Patented July 10, 1962

3,043,598
SEALING DEVICE
Leslie Allan Moxon, Alvechurch, Birmingham, England, assignor to Super Oil Seals & Gaskets Limited, Birmingham, England, a British company
Filed Oct. 29, 1958, Ser. No. 770,541
Claims priority, application Great Britain Nov. 1, 1957
2 Claims. (Cl. 277—86)

This invention concerns a sealing device for use between a rotary shaft, having a driving means (e.g. a collar) thereon, and a housing or other member through which the shaft extends.

According to this invention there is provided a sealing device adapted to be mounted under axial compression to effect a fluid tight seal between a shaft and a member relatively to which the shaft rotates, such device comprising a tube of resilient material having a central portion and a radial flange at each end of said tube; a spring surrounding the said tube and extending between and engaging said flanges; and a sealing ring which is adapted to seal against the said member and is secured to one of said flanges so as to extend axially away from the tube, the internal diameter of the sealing ring being greater than the external diameter of the said tube central portion and the latter merging into the flange to which the sealing ring is secured by a tube portion which, in section, is arcuate, being convex towards the axis of the tube.

Figure 1:
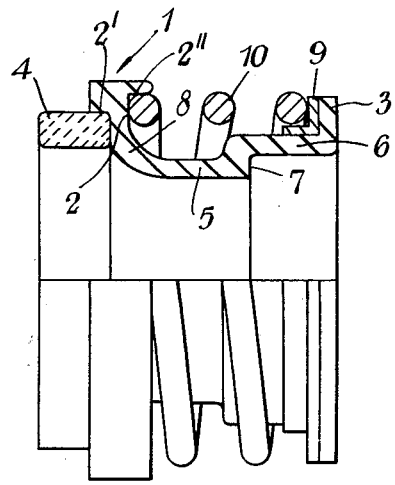
Figure 2:
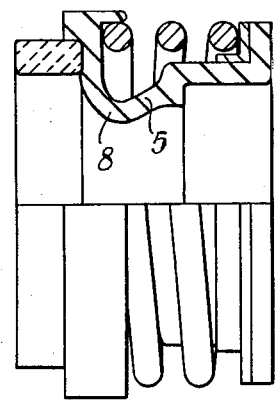
Figure 3:
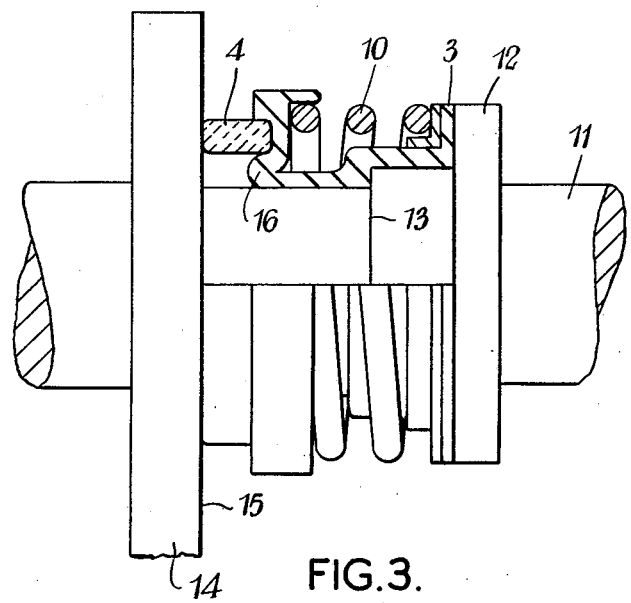

The invention is illustrated, merely by way of example, in the accompanying drawings, in which:

FIG. 1 is an elevation, partly in section, of a sealing device according to the invention, said sealing device being shown in the free (i.e. uncompressed) state, FIG. 2 is a view similar to FIG. 1 but showing the shape of the sealing device when subjected to axial compression, and FIG. 3 is an elevation, partly in section, of the sealing device of FIGS. 1 and 2 mounted upon a rotary shaft so as to be axially compressed between a collar on the shaft and a housing wall through which the shaft extends.

Referring first to FIG. 1, a sealing device according to the invention comprises a tube 1 of rubber, synthetic rubber or the like, the tube 1 having radial flanges 2, 3 respectively at opposite ends thereof. Bonded or otherwise secured to the flange 2 so as to be in contact with a shoulder 2' thereof is a sealing ring 4 (e.g. of carbon, synthetic carbon, metal), a ceramic material, or a high temperature polymer (such as polytetrafluoroethylene) which extends axially away from the tube 1.

The tube 1 has a central portion 5 of relatively small internal diameter and a shoulder portion 6 of relatively large internal diameter, the portions 5, 6 being separated by a shoulder 7. The shoulder portion 6 extends adjacent the flange 3 whilst the central portion 5 merges smoothly into the flange 2 by way of a portion inclined in relation to the axis of the shaft. As shown this inclined portion is in the form of a radiused arcuate portion 8 convex towards the axis of the tube. It will be noted that the internal diameter of the sealing ring 4 is greater than the external diameter of the portion 5.

Mounted about the shoulder portion 6 of the sealing device is an annular spring plate 9 which is L-shaped in section, one limb of the L lying firmly in contact with the shoulder portion 6 and the other limb lying against the flange 3. A helical compression spring 10 is mounted about the tube 1, one end of the spring 10 bearing against the flange 2 so as to engage behind a shoulder 2" thereof and the other end of the spring engaging the annular spring plate 9.

If reference be made to FIG. 2, it will be seen that when the sealing device is axially compressed, the central portion 5, and still more the radiused arcuate portion 8, will bulge radially inwardly.

In FIG. 3, the sealing device is shown mounted under axial compression upon a rotary shaft 11 having a driving collar 12 and a shoulder 13 corresponding to the shoulder 7. The shaft 11 extends through an opening in a member 14, which may, for instance, be part of a housing.

The flange 3 of the sealing device bears against the driving collar 12, the internal diameter of the annular spring plate 9 being such as to make the tube 1 an interference fit on the shaft 11, whereby a positive drive is transmitted to the sealing device on rotation of the shaft. The sealing ring 4 is thrust against the surface 15 of the member 14 by the spring 10.

It will be seen from FIG. 3 that the capacity of the tube 1 to bulge radially inwardly on axial compression has resulted in the tube 1 forming a bulge 16 extending inwardly and axially of the sealing ring 4. This bulge serves to effect an oil-tight seal between the tube 1 and shaft 11 and, at the same time, serves to contact the inner cylindrical surface of the sealing ring 4 to ensure that the inner and outer surfaces of the sealing ring 4 are tightly gripped while the sealing ring is presented to the surface 15. On rotation of the shaft 11, the sealing device will rotate in unison with the shaft, the sealing ring 4 being maintained in rubbing contact with the surface 15.

I claim:

1. A seal between a shaft and a member relatively to which the shaft rotates, such seal comprising a tube of resilient material surrounding the shaft, a radial flange at each end of the tube, one of said flanges engaging a part which is rotatable with the shaft but is axially fixed thereon, a sealing ring which is secured to the other of said flanges so as to extend axially away from the tube and bears against the said member, such sealing ring having an internal diameter greater than the external diameter of the shaft, a compression spring surrounding the said tube and extending between and engaging the flanges, and a bulge in the said tube wedged between the said sealing ring and the shaft.

2. The seal specified in claim 1 in which an axial flange projects from the flange to which the sealing ring is secured and extends externally around the adjacent end of the compression spring and an annular spring plate contacts the other flange and receives the opposite end of the compression spring.

References Cited in the file of this patent

UNITED STATES PATENTS

| | | |
|---|---|---|
| 2,365,065 | Frankenfield | Dec. 12, 1944 |
| 2,408,909 | Brummer | Oct. 8, 1946 |
| 2,426,047 | Payne | Aug. 19, 1947 |
| 2,463,695 | Jensen | Mar. 8, 1949 |
| 2,474,123 | Schmitz | June 21, 1949 |
| 2,614,874 | Helfrecht | Oct. 21, 1952 |

FOREIGN PATENTS

| | | |
|---|---|---|
| 761,815 | Great Britain | Nov. 21, 1956 |